United States Patent [19]
Lo et al.

[11] Patent Number: 5,464,914
[45] Date of Patent: Nov. 7, 1995

[54] PREPARATION OF A LOW POLYDISPERSE POLYMER

[75] Inventors: Grace Y. Lo; Arnold L. Gatzke, both of Midland, Mich.

[73] Assignee: The Dow Chemical Company, Midland, Mich.

[21] Appl. No.: 268,212

[22] Filed: Jun. 29, 1994

[51] Int. Cl.⁶ ............................. C08F 4/48; C08F 236/10
[52] U.S. Cl. .................... 526/180; 502/155; 502/157; 526/217; 526/335; 526/338; 526/340; 526/347; 526/347.1
[58] Field of Search .................... 526/180, 340, 526/347

[56] References Cited

U.S. PATENT DOCUMENTS

| | | | |
|---|---|---|---|
| 3,663,634 | 5/1972 | Morton | 260/665 R |
| 3,668,263 | 6/1972 | Morrison | 260/665 R |
| 3,725,368 | 4/1973 | Morrison | 526/180 |
| 3,766,964 | 12/1973 | Morrison | 526/174 |
| 4,138,536 | 2/1979 | Hsieh | 526/19 |
| 4,196,154 | 4/1980 | Tung et al. | |
| 4,427,837 | 1/1984 | Tung | 525/314 |
| 4,960,842 | 10/1990 | Lo | 526/175 |
| 5,089,572 | 2/1992 | Marchand et al. | |

OTHER PUBLICATIONS

"An Efficient Bifunctional Lithium–Organic Initiator to Be Used in Apolar Solvents" listed in Polymer, 1982, vol. 23, Dec., by Pierre Lutz, Emile Franta and Paul Rempp.

"Bifunctional Anionic Iniators: A Critical Study and Overview" listed in Makromol Chem. 186, 2017–2024 (1985) by Friedhelm Bandermann, Hans–Dieter Speikamp, Ludwig Weigel.

"A New Difunctional Anionic Initiator" listed in Macromolecules vol. 10, No. 2, Mar.–Apr. 1977 by R. P. Foss, H. W. Jacobson and W. H. Sharkey.

"Addition of Sec–butyllithium to m–diisopropenylbenzene" listed in Polymer 1979 Vo. 20 Sep. by G. Gordon Cameron and Gavin M. Buchan.

Primary Examiner—Fred Zitomer

[57] ABSTRACT

A liquid hydrocarbon soluble difunctional organolithium initiator (DFI) is reacted with an anionically polymerizable monomer, such as isoprene or 1,3-butadiene, in the presence of a diamine or a triamine to form a polymer having low polydispersity and high tensile strength. The DFI is prepared by reacting a dialkenylarylene compound with an alkyl-lithium in a nonpolar solvent and in the presence of sufficient quantities of a trisubstituted amine to prevent precipitation of the DFI in the solvent.

19 Claims, No Drawings

PREPARATION OF A LOW POLYDISPERSE POLYMER

BACKGROUND OF THE INVENTION

This invention relates to a process of initiating the polymerization of an anionically polymerizable monomer to prepare a polymer having a low polydispersity index and high tensile strength. Polymers of this type are useful as adhesives and elastomers.

Much effort has been directed to the preparation of polydienes with precisely-controlled molecular weight, functionality, and microstructure (that is, 1,4 addition). For example, Tung et al. (U.S. Pat. No. 4,196,154, incorporated herein by reference) discloses the polymerization of a conjugated diene to give a high degree of 1,4 addition. This polymerization reaction is initiated by 1,3-phenylenebis(3-methyl-l-phenylpentylidene)bis(lithium), a liquid hydrocarbon soluble difunctional organolithium initiator (DFI), shown below:

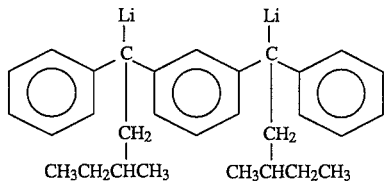

1,3-phenylene-bis(3-methyl-1-phenylpentylidene)bis(lithium)

Tung et al. discloses that "for uniformity of the product and maximum control, as well as ease of handling, it is desirable that an initiator be soluble in the polymerization system, rather than merely dispersible as a particulate material."

Lo et al. (U.S. Pat. No. 4,960,842, incorporated herein by reference) discloses a method of lowering the polydispersity of a polymer by initiating the polymerization of at least one anionically polymerizable monomer using the specific DFI described in Tung et al.; and carrying out the polymerization in the presence of an organic diamine or triamine. Though the polymers described by Tung et al. and Lo et al. exhibit the desired tensile strength and polydispersity, commercial viability is impaired because the process requires an expensive DFI.

Attempts to prepare useful polymers with a less expensive DFI, such as 1,3-bis(1-lithio-1,3-dimethylpentyl)benzene, shown below, have not been successful, presumably due to the difficulty in preparing a pure DFI.

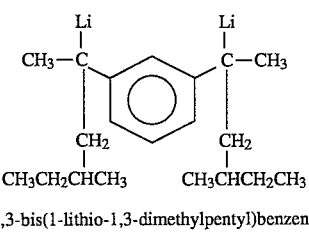

1,3-bis(1-lithio-1,3-dimethylpentyl)benzene

For example, attempts to prepare this DFI from m-diisopropenylbenzene and sec-butyllithium in the presence of low levels of triethylamine does not give a pure diadduct, but rather "a mixture of bi- and polyfunctional material, together with unreacted sec-butyllithium" (see Cameron et al., *Polymer*, 20, 1129, 1132 (1979), incorporated herein by reference). Cameron et al. concludes that "the use of this system as a bifunctional initiator must be viewed with suspicion."

It is therefore desirable to prepare polymers, and more particularly triblock copolymers, having a polydispersity of less than 1.4 and tensile strength of greater than 1500 psi, using an inexpensive, high purity DFI that is rendered soluble in a nonpolar solvent.

SUMMARY OF THE INVENTION

The present invention is a process comprising dissolving and reacting in a nonpolar solvent and in the presence of an organic polyamine and a trisubstituted amine, an anionically polymerizable monomer or monomers and a difunctional organolithium initiator corresponding to the formula:

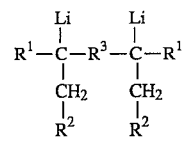

wherein $R^1$ and $R^2$ are each independently $C_1$ to $C_6$ branched or linear alkyl or cycloalkyl groups; and $R^3$ contains at least one arylene group and is attached to each lithium-substituted carbon atom of the above formula through an aromatic carbon; and wherein the polyamine corresponds to the formula:

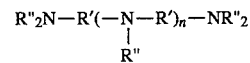

wherein R' independently in each occurrence is a $C_2$–$C_{20}$ alkadiyl group or an inertly-substituted derivative thereof; R" independently in each occurrence is a $C_1$–$C_{20}$ alkyl group or an inertly-substituted derivative thereof; and n is 0 or 1.

In a further aspect, the present invention is a process comprising dissolving and reacting 1,3-bis(1-lithio-1,3-dimethylpentyl) benzene, styrene, and isoprene or 1,3-butadiene in a linear or branched alkane or cycloalkane solvent, and in the presence of N,N,N',N",N"-pentamethyldiethylenetriamine and triethylamine, under conditions such that a styrene-isoprene-styrene triblock copolymer or a styrene-butadiene-styrene triblock copolymer having a tensile strength of greater than 2000 psi and a polydispersity index of less than 1.3 is formed.

The present invention achieves the stated objectives by preparing a useful polymer using an inexpensive DFI that is rendered soluble in the solvent used to prepare the polymer.

DETAILED DESCRIPTION OF THE INVENTION

An anionically polymerizable monomer is one whose polymerization can be initiated by an anionic initiator, more particularly, the DFI disclosed herein.

Representative anionically polymerizable monomers useful in the practice of the present invention are conjugated diene monomers and copolymerizable olefin monomers. Representative conjugated diene monomers include 1,3-butadiene, isoprene, and mixtures thereof; representative copolymerizable olefin monomers include an alkenyl aromatic monomer corresponding to the formula:

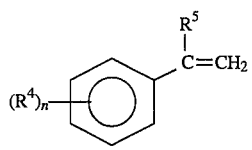

where n is an integer from 0 to 3, $R^4$ is an alkyl radical containing up to 5 carbon atoms and $R^5$ is hydrogen or methyl. Preferred alkenyl aromatic monomers are styrene, vinyl toluenes, α-methylstyrene, and mixtures thereof. More preferred alkenyl aromatic monomers are styrene and mixtures of styrene and α-methylstyrene.

The process of the present invention is particularly useful for the preparation of triblock copolymers. Thus, the anionically polymerizable monomer preferably comprises at least two distinct anionically polymerizable monomers.

As mentioned above, the polymerization of the anionically polymerizable monomer is initiated in the presence of an organic polyamine. The organic polyamine is a diamine or a triamine which contains unsubstituted or inertly-substituted $C_2$–$C_{20}$ alkadiyl groups and $C_1$–$C_{20}$ alkyl groups. The term "inertly-substituted" is used to describe a substituent which neither interferes with the polymerization process nor adversely influences the properties of the polymer. Examples of inertly-substituted groups include alkyl and aryl groups.

The organic polyamine is preferably selected from the group consisting of N,N,N',N",N"-pentamethyldiethylenetriamine; N,N,N',N",N"-pentamethyl-di-1,3-propylenetriamine; 4-ethyl-1,1,7,7-tetramethyldiethylenetriamine; and N,N,N',N'-tetramethylethylenediamine. A particularly preferred polyamine is N,N,N',N",N"-pentamethyldiethylenetriamine.

The organic polyamine is used in an amount effective to reduce the polydispersity (the ratio of weight average molecular weight to number average molecular weight or $M_w/M_n$) relative to when no polyamine is present. Preferably, the mole ratio of organic polyamine to a lithium site on the difunctional organolithium initiator (DFI) is from about 0.005:1, and more preferably from about 0.02:1, to preferably 1:1, and more preferably to 0.5:1.

The polymerization process is advantageously carried out in the absence of moisture, and in an inert atmosphere, such as under a positive pressure of nitrogen or argon. The process employs a nonpolar solvent. Preferred nonpolar solvents include inert hydrocarbon solvents, or a mixture of inert hydrocarbon solvents. Preferred hydrocarbon solvents are linear or branched alkanes or cycloalkanes, or alkyl-substituted benzenes. More preferred hydrocarbon solvents are pentane, isopentane, cyclopentane, hexane, cyclohexane, toluene, and mixtures thereof. Cyclohexane is an especially preferred solvent.

The solvent may also be one of the monomers used for polymerization. Thus, α-methylstyrene may be used as a solvent in the preparation of block copolymers containing a styrene/α-methylstyrene copolymer as the olefin block.

It may be desirable to perform a blanking procedure to remove residual impurities in the mixture, thereby improving the quality of the polymer that will be formed. To determine if blanking is advantageous, an aliquot of solution containing the solvent, the triamine, and the anionically polymerizable monomer or monomers are removed from the reaction vessel and titrated with an organolithium compound, preferably the DFI, to determine the amount of impurity in the reaction mixture. If the amount of organolithium required to titrate the impurities is more than 5 mol percent of the DFI used to initiate polymerization, then blanking is advantageously performed. An example of a teaching of blanking processes can be found in U.S. Pat. No. 5,089,572, incorporated herein by reference.

The reaction is carried out at a temperature sufficient to initiate and sustain polymerization at a controlled rate. Reaction temperatures are preferably from about ambient temperature to less than or equal to the boiling point of the solvent.

The polymers prepared by the process described herein have a tensile strength at rupture of 1500 psi or greater, preferably 2000 psi or greater. These polymers exhibit a polydispersity ($M_w/M_n$) of 1.4 or less, more preferably 1.3 or less, and most preferably 1.2 or less. The weight average molecular weight ($M_w$) and number average molecular weight ($M_n$) of the polymers can be determined by gel permeation chromatography. The $M_n$ is preferably from about 25,000, more preferably from about 50,000, and most preferably from about 70,000 Daltons; to about 500,000, more preferably to about 300,000, and most preferably to about 200,000 Daltons.

PREPARATION OF THE DFI

The DFI used in the present invention can be prepared by reacting in an inert nonpolar solvent and in the presence of a trisubstituted amine, a DFI precursor with about a stoichiometric amount of an alkyllithium. The DFI precursor corresponds to the formula:

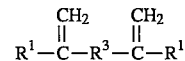

where $R^1$ is a $C_1$ to $C_6$ branched or linear alkyl or cycloalkyl group; and $R^3$ contains at least one arylene group and is attached to each adjacent carbon atom of the above formula through an aromatic carbon; the alkyllithium corresponds to the formula $R^2Li$, where $R^2$ is a $C_1$ to $C_6$ branched or linear alkyl or cycloalkyl group; and the DFI corresponds to the formula:

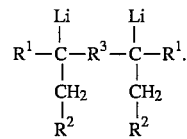

The preparation of the DFI is advantageously carried out in the absence of moisture and in an inert atmosphere, such as under a positive pressure of nitrogen or argon.

The inert, nonpolar solvent is the same as or compatible with the solvent used in the polymerization process. The term "inert, nonpolar solvent" refers to a nonpolar solvent which does not adversely interfere with the preparation of the DFI, nor adversely influences its properties. The solvent is preferably an inert hydrocarbon solvent, or a mixture of inert hydrocarbon solvents. Preferred inert hydrocarbon solvents are linear or branched alkanes or cycloalkanes, or alkyl-substituted benzenes. More preferred inert hydrocarbon solvents are pentane, isopentane, cyclopentane, hexane, cyclohexane, toluene, and mixtures thereof. Cyclohexane is an especially preferred solvent.

The reaction is carried out in the presence of sufficient quantities of the trisubstituted amine to prevent precipitation of the DFI in the inert nonpolar solvent, and to keep the DFI dissolved in the solvent used in the polymerization reaction. Preferably, the mole ratio of trisubstituted amine to lithium site of the DFI is from about 1, more preferably from about 2.5, most preferably from about 5; to about 40, more preferably to about 20, most preferably to about 10. The trisubstituted amine is preferably a trialkylamine, more preferably a trialkylamine wherein the alkyl groups are each independently $C_1$ to $C_4$ alkyl groups, and most preferably triethylamine.

PREPARATION OF THE DFI PRECURSOR

The DFI precursor is a dialkenylarylene which can be readily prepared by reacting sufficient quantities of a $C_1$ to $C_6$ branched or linear alkyl or cycloalkyl acid chloride with an aromatic compound such as benzene, biphenyl, diphenyl ether, 2,2-diphenylpropane, and the like in the presence of a Friedel-Crafts catalyst such as aluminum chloride to form a diketone, preferably a meta-substituted diketone. The diketone can then be transformed to 1,1'-vinylidene groups by way of, for example, a Wittig reaction wherein the diketone is treated with a phosphonium salt and a strong base to give the desired DFI precursor. The general scheme is illustrated as shown:

$$2R^1-\overset{O}{\underset{\|}{C}}-Cl+H-R^3-H \xrightarrow{AlCl_3}$$

$$R^1-\overset{O}{\underset{\|}{C}}-R^3-\overset{O}{\underset{\|}{C}}-R^1 \xrightarrow{Wittig} R^1-\overset{CH_2}{\underset{\|}{C}}-R^3-\overset{CH_2}{\underset{\|}{C}}-R^1$$

$R^1$ is preferably methyl or ethyl, more preferably methyl; and $R^3$ is preferably selected from the group consisting of:

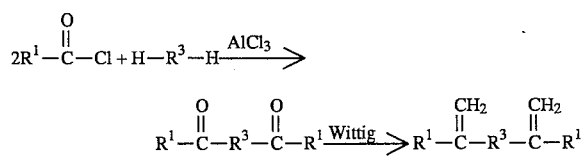

and

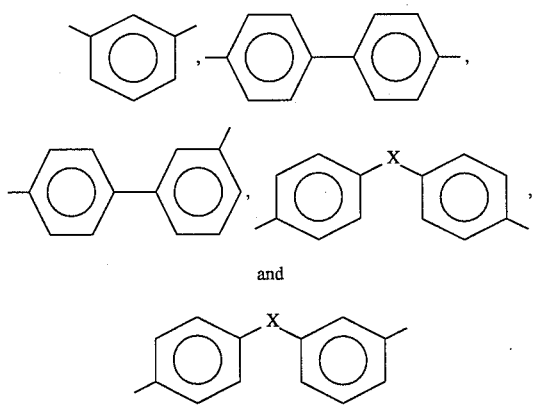

where X is O, S, or $CH_3-C-CH_3$.

$R^3$ is more preferably m-phenylene. The most preferred DFI precursor is the commercially available m-diisopropenylbenzene, which can also be prepared by direct alkylation of benzene with propylene, followed by catalytic dehydrogenation:

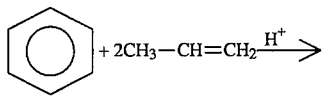

m-diisopropenylbenzene $R^2$ is preferably a-butyl or sec-butyl, more preferably sec-butyl. Thus, the alklyllithium is preferably n-butyllithium or sec-butyllithium, more preferably sec-butyllithium. The DFI precursor is preferably used in a slight stoichiometric excess with respect to the alkyllithium. More particularly, the molar ratio of alkyllithium to DFI precursor is preferably from about 1.80, more preferably about 1.90, and most preferably about 1.95 to about 2.00.

The invention disclosed herein suitably may be practiced in the absence of any component not specifically disclosed herein.

EXAMPLE 1A

Preparation of 1,3-Phenylene-bis(1,3-dimethylpentylidene) bis(lithium) using a Mole Ratio of Triethylamine to sec-Butyllithium of 10:1

To a 250 mL round-bottom flask equipped with a magnetic stirrer, a reflux condenser, a rubber septum-capped side arm, and an external water bath is added purified cyclohexane (80 mL) and distilled triethylamine (TEA, 15 mL, 107 mmol). These reagents are deoxygenated and the solution is heated with stirring under nitrogen to 44° C., whereupon 7.3 mL of a solution containing cyclohexane and 10.64 mmol of sec-butyllithium, and 0.92 mL of purified m-diisopropenylbenzene are successively added. The reaction mixture is stirred for 10 minutes. The concentration of the DFI 1,3-phenylenebis(1,3-dimethylpentylidene)bis(lithium) is calculated to be 0.052 mmol per mL of solution, based on the assumption of 100 percent conversion of the sec-butyllithium.

EXAMPLE 1B

Preparation of a Styrene-Isoprene-Styrene Triblock Copolymer Using the DFI from Example 1A To a 1.3-liter jacketed reactor equipped with a stirrer is added purified cyclohexane (610 mL), which is then deoxygenated. Then, freshly distilled isoprene (112 mL, 76 g) and 0.5 mL of cyclohexane solution containing 0 21 mmol of N,N,N',N",N"-pentamethyldiethylenetriamine (PMDETA) are each added to the reactor by way of syringe. The reaction mixture is heated with stirring to 55° C., whereupon 13.7 mL of the DFI as prepared in Example 1A (0.71 mmol) is added. A nitrogen pressure of 8–14 psi is maintained in the head space of the reactor during the course of the reaction. After 45 minutes, styrene (15 mL, 13.6 g) is added to the reaction mixture. The reaction is stirred for another 30 minutes before isopropanol (0.3 mL) is added to quench the reaction. The polymer solution is discharged from the reactor and treated with carbon dioxide. Then, 2,6-di-t-butyl-4-methylphenol (1.5 g) is added to the polymer solution to stabilize the polymer against oxidation. The polymer is then dried in a vacuum oven at 140° C. The weight average molecular weight ($M_w$) is found to be 146,000, and the number average molecular weight ($M_n$) is found to be 133,000 by gel permeation chromatography. The properties of this polymer are tabulated in Table I.

EXAMPLE 2A

A Preparation of 1,3-Phenylene-bis(1,3-dimethylpentylidene) bis(lithium) using a Mole Ratio of Triethylamine to sec-Butyllithium of 2.5:1

The DFI is formed in the same manner as described in Example 1A except that 3.75 mL (27 mmol) of TEA is used. The concentration of the DFI, 1,3-phenylenebis(1,3-dimethylpentylidene)bis(lithium) is calculated to be 0.058 mmol per mL of solution, based on the assumption of 100 percent conversion of the sec-butyllithium.

EXAMPLE 2B

Preparation of a Styrene-Isoprene-Styrene Triblock Copolymer Using the DFI from Example 2A The triblock copolymer is prepared using the DFI from Example 2A under substantially the same reaction conditions as described in Example 1B. In this example, 630 mL of cyclohexane, 117 mL (80 g) of isoprene, 0.5 mL of cyclohexane containing 0.22 mmol of PMDETA, 13.4 mL of the DFI prepared in Example 2A (0.78 mmol) and 16 mL (14.5 g) styrene are used. The $M_w$ is found to be 143,000 and the $M_n$ is found to be 129,000 by gel permeation chromatography. The properties of this polymer are tabulated in Table I.

TABLE I

Properties of Styren-Isoprene-Styrene Triblock Elastomers Using the DFI as Prepared in Examples 1A and 2A

|  | PMDETA/Li mol ratio | Poly-dispersity (Mw/Mn) | Tensile Strength (psi) |
| --- | --- | --- | --- |
| DFI prepared as in Example 1A | 0.15 | 1.10 | 2520 |
| DFI prepared as in Example 2A | 0.15 | 1.11 | 2300 |

What is claimed is:

1. A process comprising dissolving and reacting in a nonpolar solvent and in the presence of an organic polyamine and a sufficient quantity of a trisubstituted amine to keep a difunctional organolithium initiator dissolved in the nonpolar solvent, an anionically polymerizable monomer or monomers selected from the group consisting of conjugated diene monomers and copolymerizable olefin monomers, the difunctional organolithium initiator corresponding to the formula:

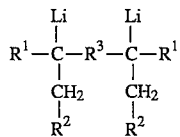

wherein $R^1$ and $R^2$ are each independently $C_1$ to $C_6$ branched or linear alkyl or cycloalkyl groups; and $R^3$ contains at least one arylene group and is attached to each lithium-substituted carbon atom of the above formula through an aromatic carbon; and wherein the organic polyamine corresponds to the formula:

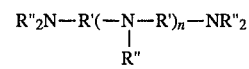

wherein R' independently in each occurrence is a $C_2$–$C_{20}$ alkadiyl group or an inertly-substituted $C_2$–$C_{20}$ alkadiyl group; R" independently in each occurrence is a $C_1$–$C_{20}$ alkyl group or an inertly-substituted $C_1$–$C_{20}$ alkyl group; and n is 0or 1.

2. The process of claim 1 wherein the anionically polymerizable monomer comprises at least two distinct anionically polymerizable monomers, at least one of which is a conjugated diene.

3. The process of claim 2 wherein at least one of the anionically polymerizable monomers is an alkenyl aromatic monomer.

4. The process of claim 3 wherein the conjugated diene comprises isoprene, 1,3-butadiene, or a mixture thereof, and the alkenyl aromatic monomer comprises styrene, α-methylstyrene, or a mixture thereof.

5. The process of claim 4 wherein the polyamine is selected from the group consisting of N,N,N',N",N"-pentamethyldiethylenetriamine; N,N,N',N",N"-pentamethyl-di-1,3-propylenetriamine; 4-ethyl-1,7,7-tetramethyldiethylenetriamine; and N,N,N',N'-tetramethylethylenediamine.

6. The process of claim 5 wherein the polyamine is N,N,N',N",N"-pentamethyldiethylenetriamine 7. The process of claim 6 wherein the mole ratio of N,N,N',N",N"-pentamethyldiethylenetriamine to a lithium site of the difunctional organolithium initiator is from about 0.02:1 to about 0.5:1.

8. The process of claim 2 wherein $R^3$ is selected from the group consisting of:

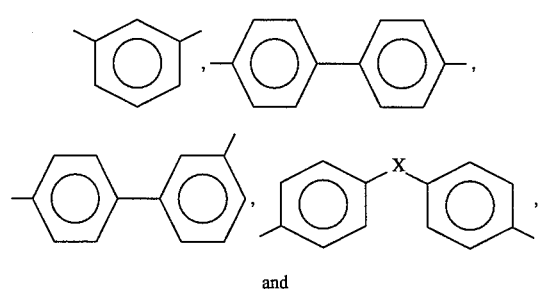

and

-continued

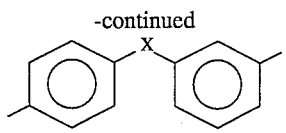

where X is O, S, or CH$_3$—C—CH$_3$.

9. The process of claim 8 wherein R$^3$ is m-phenylene.

10. The process of claim 9 wherein R$^1$ is a methyl group.

11. The process of claim 10 wherein R$^2$ is a sec-butyl group.

12. The process of claim 11 wherein the solvent is selected from the group consisting of pentane, isopentane, cyclopentane, hexane, cyclohexane, toluene, and mixtures thereof.

13. The process of claim 12 wherein the solvent is toluene or cyclohexane.

14. The process of claim 2 wherein the trisubstituted amine is a trialkylamine.

15. The process of claim 14 wherein the trialkylamine is triethylamine.

16. The process of claim 15 wherein the mole ratio of the triethylamine to a lithium site on the difunctional organolithium initiator is from about 1:1 to about 40:1.

17. The process of claim 16 wherein the mole ratio of the triethylamine to a lithium site on the difunctional organolithium initiator is from about 2.5:1 to about 10:1.

18. A process comprising dissolving and reacting 1,3-bis(1-lithio-1,3-dimethylpentyl)benzene, styrene, and isoprene or 1,3-butadiene in a linear or branched alkane or cycloalkane solvent, and in the presence of N,N,N',N",N"-pentamethyldiethylenetriamine and triethylamine, under conditions such that a styrene-isoprene-styrene triblock copolymer or a styrene-butadiene-styrene triblock copolymer having a tensile strength of greater than 2000 psi and a polydispersity index of less than 1.3 is formed.

19. The process of claim 16 wherein the mole ratio of the triethylamine to a lithium site on the difunctional organolithium initiator is from about 2.5:1 to about 10:1.

\* \* \* \* \*

UNITED STATES PATENT AND TRADEMARK OFFICE
CERTIFICATE OF CORRECTION

PATENT NO. : 5,464,914
DATED : November 7, 1995
INVENTOR(S) : Grace Y. Lo et al.

It is certified that error appears in the above-indentified patent and that said Letters Patent is hereby corrected as shown below:

On the title page: Item [56] Reference Cited:

, "3,766,964" should read -- 3,776,964 --.

Col. 8, line 43, "4-ethyl-1,7,7-tetramethyldiethylenetriamine;" should read -- 4-ethyl-1,1,7,7-tetramethyldiethylenetriamine; --.

Col. 8, line 46, "N,N,N',N", N"-pentamethyldiethylenetriamine" should read -- N,N,N',N", N"-pentamethyldiethylenetriamine. --.

Signed and Sealed this

Twenty-first Day of July, 1998

Attest:

BRUCE LEHMAN

Attesting Officer  Commissioner of Patents and Trademarks